Figure 1:
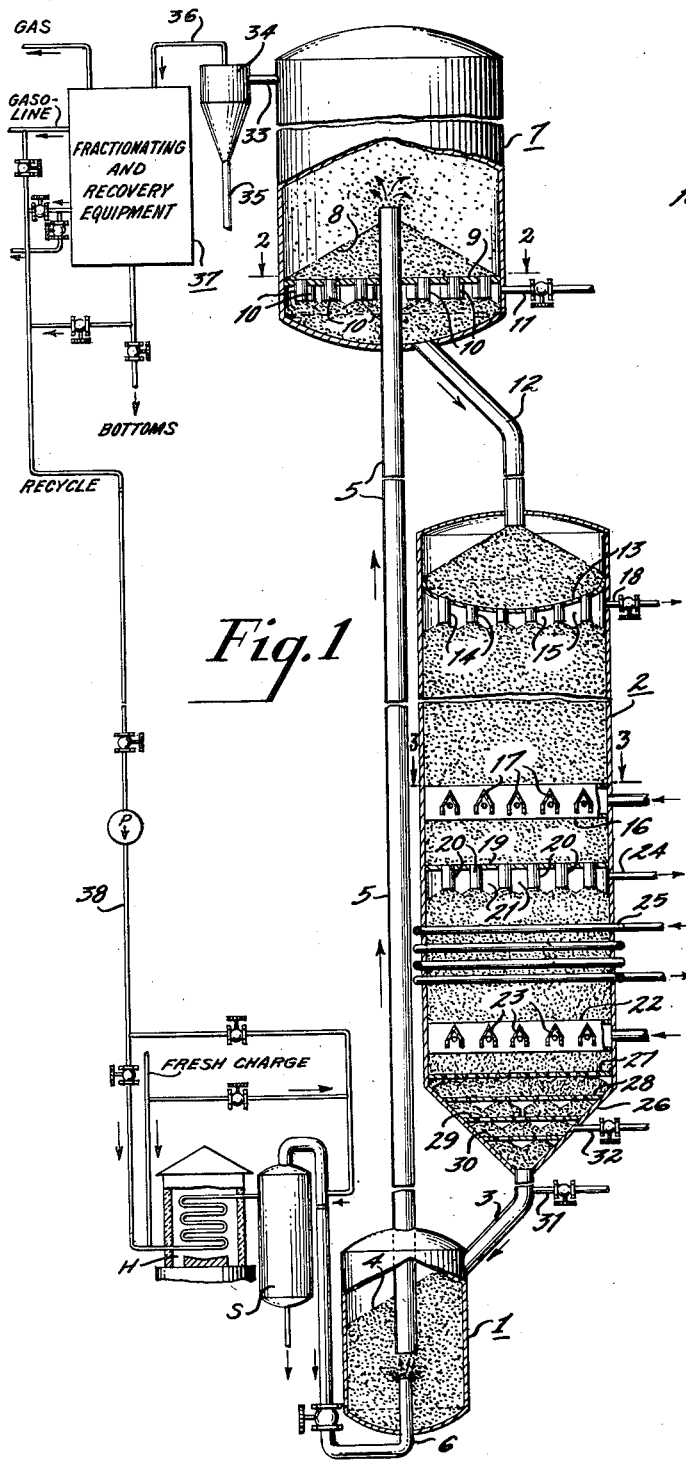

Feb. 10, 1953

C. G. KIRKBRIDE ET AL 2,628,188

HYDROCARBON CONVERSION PROCESS UTILIZING
THE GAS LIFT AS THE CONVERSION ZONE
Filed July 21, 1949

INVENTORS
*Chalmer G. Kirkbride*
*& Jack C. Dart*
BY
*B. Mart Levit*
ATTORNEY

Patented Feb. 10, 1953

2,628,188

UNITED STATES PATENT OFFICE 2,628,188

HYDROCARBON CONVERSION PROCESS UTILIZING THE GAS LIFT AS THE CONVERSION ZONE

Chalmer G. Kirkbride, Wallingford, and Jack C. Dart, Moylan, Pa., assignors to Houdry Process Corporation, Philadelphia, Pa., a corporation of Delaware Application July 21, 1949, Serial No. 105,954

7 Claims. (Cl. 196—52)

The present invention relates to catalytic hydrocarbon conversion processes and is especially directed to cracking of hydrocarbons. The invention is particularly concerned with the provision of an efficiently operating system and process wherein a body of catalyst is elevated and transported by a stream of hydrocarbons charged thereto, the hydrocarbons being cracked to a significant and desired extent during such transportation.

In catalytic conversion systems employing a compact gravitating bed of catalyst in the conversion reactor, hydrocarbons have been charged to the reaction for either concurrent or countercurrent flow with the catalyst. Maintaining a fixed catalyst circulation rate and a given oil throughput, the severity of cracking can be varied within certain limits by modifying the hydrocarbon charge space rate (quantity of oil/hour per quantity of catalyst in reactor), which is accomplished by varying the depth of the bed. The catalyst circulation rate is fairly well fixed in systems of this type which employ mechanical elevators in circulation of the catalyst, while it is undesirable to modify the charging rate of the oil in practical operation because of resulting sacrifice in economics by operation of the unit at below capacity, and because of the relation of the conversion unit to auxiliary equipment employed in preparation of the charge stock and handling of the effluent.

Also in commercial use are so-called "fluidized" bed systems wherein finely divided or powdered catalyst mixes with the gaseous reactants to form a turbulent gas-solid dense phase bed. These systems depend upon the use of powdered catalyst of diversified size distribution, usually of a size range predominantly below 200 mesh with a considerable portion of the particles being in the order of 400 mesh and finer. At relatively low gas velocities in the order of about 0.5 to 1 foot per second passed through a body of such finely divided particles, the mass becomes aerated to form a turbulent dense phase gas-solid mixture which behaves largely as a liquid. A principal drawback in the practical operation of this type of system is that only a nonselected portion of the catalyst is continuously withdrawn from the reactor, operating on the basis of statistical distribution and irrespective of the quantity of carbonaceous deposit that may have been formed in individual particles of the catalyst during the conversion reaction. This condition prevails as a result of almost instantaneous admixture of fresh or freshly regenerated catalyst with that already present in the turbulent mass in the hydrocarbon conversion zone, so that the catalyst withdrawn from such zone is a mixture of particles which have been in use for various lengths of time, including freshly added catalyst and catalyst of less than average activity which has been in use in such zone for longer than the average time. Thus, a portion of the catalyst retained in the reactor necessarily includes that already containing an amount of coke, reducing catalyst activity to below the desired average, while other portions of the catalyst are sent to regeneration without any significant accumulation of coke therein.

On the other hand, in compact gravitating bed systems, the solid catalytic contact mass is employed in granules or shaped masses of considerably larger size. The individual solid particles are of relatively uniform size, in the order of about 1 to 5 millimeters in diameter, and usually of 2 to 4 millimeters diameter, thus being decidedly outside of the size range of the finely divided particles or powder ordinarily handled in fluidized bed operations. Granular particles (such as pellets) of this larger size, as opposed to the fine powders of fluidized operations, form non-turbulent moving beds through which gases and vapors can be passed under practical operating conditions and at desired flow rates, without causing prohibitively excessive pressure drops in passing gases or vapors downwardly through the bed of the solid contact mass and without causing substantial lifting or "boiling" of the solid mass by upward passage of the gases or vapors therethrough. Thus, gases can be passed upwardly through compact beds of such larger sized granular particles at pressure drops of above 4 to 6 inches of water per linear foot of bed height lifting of particles from the bed, and without substantially preventing downward movement of the bed as opposed to the heretofore mentioned finely divided particles employed in "fluidized" operations which are in pseudo-liquid condition at pressure drops of about 0.2 inch of water per foot of bed depth and which necessitate reaction vessels of relatively larger cross-section to provide the desired catalyst concentrations and to permit retention of catalyst in the reaction zone at the desired concentration for sufficient average time. In gravitating compact bed reactors, the rate at which hydrocarbons vapors can be passed upwardly through the bed, and accordingly the operating oil feed rate must be maintained within limits such that the vapor velocity does not substantially impede gravitation of the catalyst bed. In concurrent flow operations, although these limitations with respect to lifting of catalyst do not apply, yet as the mass charging rate of the oil is increased the problems of pressure drop through such beds and of designing the reactor for effective disengagement of increased quantities of vaporous hydrocarbon conversion products from the solid catalyst are multiplied, creating more difficult problems of operation and design.

In our copending application Serial No. 58,532, filed November 5, 1948, of which the present application is in part a continuation, certain systems and methods are disclosed for handling such larger size catalyst and other contact masses of the size range above specified, involving contact with a gaseous stream for elevating and transporting such masses, adapted to be used in various illustrated types of processes including among those particularly disclosed, heat exchange operations. Among the operations described in said prior application, particular examples of cracking hydrocarbon charge stocks are set forth. The present application discloses further particulars of operation, adapted but not limited to the application of the invention of said prior application, particularly as directed to catalytic cracking of hydrocarbons heavier than gasoline, and has among its objects that of overcoming certain of the disadvantages heretofore pointed out in connection with the operation of prior catalytic cracking systems in use.

In accordance with the present invention, hydrocarbon charge to be converted and the catalyst are concurrently moved upwardly through a comparatively long path in a lift conduit, in which conduit selected conditions are maintained, particularly as to temperature and respective flow rates of the catalyst and the hydrocarbon charge, to effect substantial catalytic cracking of the charge to desired extent. The conditions under which the catalyst is introduced into the lift conduit and transported therein are also so controlled as to effect smooth and uniform elevation of the catalyst, free from slugging and with, for practical purposes, negligible attrition of the catalyst. Effective catalytic cracking requires certain correlated conditions, including efficient and sufficiently extensive contact of hydrocarbon charge and catalyst. In a system in which substantial cracking of the hydrocarbons is to be effected during elevation of the catalyst by the hydrocarbon charge, moreover, these conditions for effective cracking must also meet the demands imposed by conditions required for efficient elevation and circulation of the catalyst. Because of these requirements for unrelated purposes the complex problems presented are multiplied, and the development of a practical system operating in the described manner has not been successfully accomplished prior to the present invention.

In practice of the invention, hot freshly regenerated catalyst of a size in the order of about 1 to 5 mm. diameter, is charged from a regenerating kiln and is fed by gravity through a seal leg, through which the discharged catalyst flows as a compact column, to a transfer zone in which the catalyst is accumulated continuously as a temporary bed. Hydrocarbons to be cracked are brought under pressure into such transfer zone and under conditions effecting elevation of the catalyst from such temporary bed into a substantially vertical lift conduit having a feed inlet below the upper level of said bed and rising above the transfer zone, said lift conduit being of a required height as will hereinafter appear. The catalyst, impelled by the force of the hydrocarbon vapors moving past the catalyst in the lift conduit, flows as a relatively concentrated mass up the lift conduit to a vapor disengaging zone at the upper terminus of the conduit. In this disengaging zone the catalyst is separated out from the impelling influence of the hydrocarbon stream. The hydrocarbon vapors, comprising cracked and otherwise transformed products, are removed from the disengaging zone, and after discharge from such zone, may be condensed and separated into desired fractions. The catalyst, separated from the hydrocarbon vapors in the disengaging zone, in accordance with a preferred operation, will be sent directly to the regenerating kiln through which such catalyst containing hydrocarbonaceous deposit accumulated during its contact with hydrocarbons, flows by gravity as a compact bed in contact with one or more streams of oxygen-containing gas effecting combustion of the carbonaceous deposit and thereby regenerating the catalyst for further use. The regenerated catalyst is discharged from the kiln through a seal leg communicating with the transfer zone as hereinbefore described, for repetition of the cycle of operation. In utilizing the systems operating in the described manner, the use of a separate gravitating bed hydrocarbon conversion reactor can be eliminated. This preferred mode of operation thereby provides economies not only in construction costs arising from simplification of the apparatus particularly by reason of the omission of the separate reactor and necessary supporting structure therefor, but also reduces to a considerable extent the total quantity of catalyst that would otherwise be required in the system.

Figure 2:
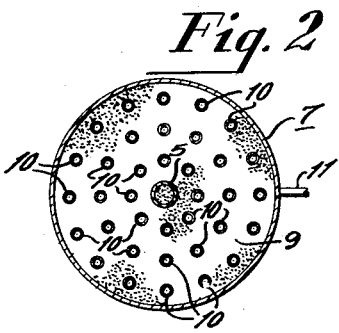
Figure 3:
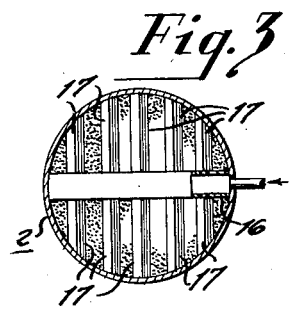
Figure 4:
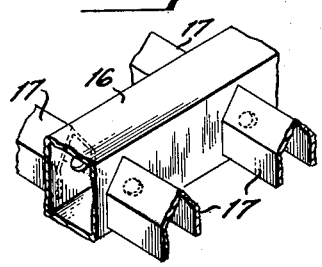

The operation of the invention will be fully understood and other advantages thereof appreciated from the description which follows read in connection with the accompanying drawings illustrating a form of apparatus for practice of the invention; wherein Figure 1 is a vertical elevation and partial cross sectional view of the apparatus as a whole, auxiliary recovery equipment being shown schematically, Figures 2 and 3 are transverse cross-sections taken respectively on the lines 2—2 and 3—3 of Figure 1, and Figure 4 is an enlarged perspective view of a partial detail showing the arrangement of the gas distributing manifold and connecting channel members in the particular type of kiln illustrated.

Referring now particularly to Figure 1, there is shown a catalyst transfer hopper 1, which receives catalyst discharged from the kiln 2, through intercommunicating conduit 3. The catalyst thus admitted to the transfer hopper forms a bed therein, assuming a level as indicated at 4 corresponding to the normal angle of repose of the catalyst. Extending vertically through the top of the transfer hopper there is shown a lift conduit 5, having an inlet at its lower end within the hopper and below the catalyst level 4. Catalyst from the bed formed in the transfer hopper is continuously impelled into the lift pipe 5 by the introduction of fluid under pressure into the hopper 1; for instance, as shown in the illustrated embodiment, by passing such gases through the catalyst bed by means of the gas introducing line 6. The lift pipe 5 terminates at its upper end within the vapor disengaging chamber 7 wherein the catalyst as a result of reduction in velocity incident to the increased cross section of the chamber, separates out from the influence of the gas stream to form a bed of catalyst in the disengaging chamber as indicated at 8.

Within the chamber 7 and below the level of the catalyst bed therein there is provided a tube sheet 9 on which the bed of catalyst is temporarily supported. The tube sheet is provided with downcomer nipples 10 arranged in appropriate pattern (see Figure 2) for uniform discharge of the catalyst over the cross section of the bed. Steam or other inert gas is introduced into the chamber 7 by means of a line 11 so as to flow upwardly through the nipples 10 for the purpose of purging the descending catalyst of occluded and of adhering vaporizable products. The purged catalyst is discharged from the chamber 7 through a conduit 12 to the top of kiln 2. The catalyst in passing through the kiln is contacted with oxygen-containing gas to burn off combustible deposit produced therein during the hydrocarbon conversion step.

The invention is not limited to the use of any particular form of kiln, and any of the known designs for handling a descending compact bed of catalyst may be employed. Kilns of the type shown in the illustrated embodiment, however, being of simplified design are particularly adapted for use in the described operation. The illustrated kiln is provided near the top thereof with a tube sheet 13 temporarily supporting the incoming catalyst, which is then discharged from the tube sheet through downcomers 14 to form a compact bed within the kiln at a level spaced from the bottom surface of the tube sheet, thereby providing a plenum between the surface of the catalyst bed and the under surface of the tube sheet, as indicated at 15. Regenerating gas is introduced into the upper section of the kiln by means of a distributing manifold 16 provided with branching steeple-shaped channel members 17, as particularly illustrated in Figures 3 and 4. The regenerating gas thus introduced passes upwardly through the bed of catalyst above the inlet to effect partial regeneration by combustion of the carbonaceous deposit in the catalyst, vaporous combustion products and unused gas, if any, being disengaged above the level of the catalyst bed within the plenum area 15. Communicating with the plenum 15 is a discharge duct 18 through which these gaseous products are discharged from the kiln.

Below the gas inlet level of the manifold 16 and communicating distributing channel members 17, the catalyst is again supported on a false bottom, as shown, in the form of the tube sheet 19. This tube sheet is provided with downcomers 20 through which the catalyst passes to form therebelow a lower bed of catalyst having a level spaced from the bottom of the tube sheet and providing a plenum therebetween as indicated at 21. Regenerating gas in introduced into the lower section of the kiln through a manifold 22 provided with distributing channel members branching therefrom as indicated at 23, which gas distribution system may be similar as to that shown in Figures 3 and 4. The regenerating gas thus introduced into the lower section of the kiln passes upwardly through the bed of catalyst above the gas inlet level, being disengaged in the plenum area 21, and is discharged through the duct 24 communicating with the plenum. If necessary for temperature control indirect heat exchange coils may be provided at one or more levels in the kiln as illustrated for instance at 25, heat exchange fluids being passed through the coils in known manner.

Uniform withdrawal of catalyst from the bottom of the kiln is obtained in the illustrated arrangement by converging the lateral wall of the kiln downwardly as indicated at 26 and by providing spaced drawoff plates as illustrated at 27, 28, 29 and 30. Each of said plates has spaced perforations arranged therein in the form of concentric circles, the number of perforations decreasing in that order from the upper to the lowermost plate. Catalyst leaving the kiln flows downwardly as a compact column through the conduit 3 and into the transfer hopper 1 to form the bed of catalyst therein.

To prevent upward flow of hydrocarbons through the conduit 3, in instances in which the pressure within the hopper 1 exceeds that at the bottom of the kiln, an inert gas may be introduced into the conduit 3 as by means of a line 31, a portion of which gas will flow upwardly through the conduit to be discharged at a level below the regeneration zone proper, for instance through a discharge conduit 32, while the remainder of the gas flows concurrently with the catalyst into the hopper 1.

The vapors disengaged from the catalyst within the vessel 7 are discharged overhead through a line 33, the fines being separated out therefrom as by means of a cyclone separator 34. These fines are discharged at the bottom of the cyclone at the outlet 35, while the vapor products are withdrawn through a line 36 passing to recovery and fractionating equipment as generally indicated at 37. The hydrocarbon vapors may be handled in the equipment 37 in known or desired manner to separate fixed gas and one or more desired condensate fractions, which may include a gasoline fraction. The gasoline fraction or other low boiling condensate is preferably recovered, but may be added, if desired, to the higher boiling fraction recycled to the lift conduit. The recycled fraction or fractions are combined with fresh feed in supply line 6 by means of connecting line 38. The bottoms from the recovery system may also be vaporized and cracked. The fresh feed and/or the recycled fraction may be at least partially preheated and/or vaporized by indirect heat exchange, taking advantage of the heat content of various products in the system 37, in known manner.

In operation of the illustrated embodiment, the hydrocarbon charge stock susceptible to cracking, such as a gas oil, is admitted under suitable pressure into the hopper 1 through the line 6 to impel catalyst within the hopper into the lift conduit 5. The lift conduit 5 serves as the principal reactor within which hydrocarbon conversion takes place in the illustrated embodiment, and accordingly the conditions of operation must be so selected that the desired extent of conversion does take place within the conduit, particularly from the standpoint of temperature, contact time and catalyst to oil ratios maintained. Moreover, the system is operated under pressure balanced conditions such that the pressure drop on the upflow side including the hopper 1 and the conduit 5, is balanced by the pressure drop provided on the downflow side including the kiln and connecting conduits. In order to provide sufficient pressure for circulating the effluent from the disengaging vessel 7 through the fractionating and recovery equipment without necessitating compression, it is advantageous to withdraw the effluent through line 33 at a suitable pressure above atmospheric. In a typical operation this may be at about 6 pounds per square inch gauge. Accordingly, the hydrocarbons must be introduced through line 6, whether fresh feed alone or including recycled hydrocarbons, at the required pressure such that the drop incurred in passing through the bed of catalyst in the hopper 1 and in elevation of the catalyst through the lift conduit 5, provides the desired pressure in the outlet line 33. Thus, if conditions are maintained to obtain a pressure drop of say 6 lbs. in the transfer hopper and in the lift conduit, the hydrocarbons must be introduced through line 6 at approximately 12 pounds per square inch gauge.

In order to realize substantial conversion of the charge in the lift reactor, conditions must be maintained to provide a minimum contact time of hydrocarbons and catalyst. The term "substantial conversion" as employed in the present application is defined as transformation of at least 30% by weight of the charge in a single pass to lower boiling products and coke (i. e. the total weight per cent of gasoline, C4 cut, dry gas and coke). To effect such substantial conversion of the charge under operative lift conditions, for most stocks of easy to average crackability in the range of light gas oil and including materials vaporizable up to about 1000° F., the residence time of the hydrocarbons in the lift reactor wherein they are contacted with hot catalyst, based on average reaction temperature of about 950° F., must be no less than approximately 1.5 seconds. For more highly refractory stocks the minimum residence time at the stated reaction temperature to obtain at least 30% conversion should be somewhat higher, as in the order of about 3 to 5 seconds.

The residence time of hydrocarbons in the lift reactor will depend upon the height of the lift pipe and the velocity of the vapors. The vapor velocity, in turn, other conditions being equal, will determine the catalyst velocity in the lift. For smooth lift operation with low attrition and substantial freedom from slugging, the maximum velocity of the catalyst, it was found by extensive investigation, should be maintained above 20 and at below about 60 feet per second, and preferably the average linear velocity should be between about 20 to 40 feet per second over the major path of travel within the lift pipe. With the operating range of catalyst velocity thus set, and having a lift pipe of fixed height, the catalyst to oil ratio and space rate will determine the degree of conversion obtained at any particular temperature. Very high catalyst to oil ratios, as in excess of about 50/1 should ordinarily be avoided, since such high ratios cause exceedingly high pressure drops necessitating correspondingly high oil feed pressures, with resulting increased difficulty of design and operation.

To achieve the described operating conditions, the lift conduit must be equivalent to at least about 100 foot in length. Although, obviously, by increasing the lift height the extent of conversion can be increased under the same operating conditions, because of practical and structural considerations the use of a single lift pipe exceeding about 300 feet in height is not advised. If desired, to decrease the required overall height of the apparatus, instead of a single lift conduit, a plurality of shorter lift conduits may be utilized in series, the catalyst from the top of one conduit being passed to the bottom of the succeeding conduit by gravity and the vapors withdrawn from each preceding conduit being also separately admitted to the succeeding conduit to operate as the lifting medium therein.

The relation of the operating variables to each other will be appreciated from the following comparisons based on typical operations consistent with the ranges set out above. For example, in the cracking of an East Texas gas oil fraction boiling in the range of about 540 to about 930° F. (28.9° A. P. I. gravity) over synthetic silica-alumina bead catalyst having an activity of approximately 33% gasoline by the CAT-A method (see "Laboratory Method for Determining the Activity of Cracking Catalyst," J. Alexander and H. G. Shimp, National Petroleum News, Technical section, August 2, 1944, pgs. R-537 and 538), the effect of modifying the catalyst velocity or the height of the lift pipe, while maintaining the same extent of conversion has been determined from experimental data. These comparisons are based on operations at a temperature of 950° F. with the addition of 10% by weight of the steam to the charge. For conversion of 60% by weight of the charge in a lift of 200 foot height, the stated conversion is obtained at a catalyst to oil ratio of approximately 27 when the average catalyst velocity is maintained at about 20 feet per second, while a catalyst to oil ratio of approximately 32 is required when the catalyst is moving at an average velocity of 30 feet per second. At the lower stated velocity the calculated vapor residence time (based on the empty conduit) is approximately 5 seconds as compared with 4 seconds at the higher velocity. To obtain the same conversion under similar operating conditions in a 300 foot lift, the corresponding catalyst to oil ratio is 22, at 20 feet per second average catalyst velocity; and 26 at a catalyst velocity of 30 feet per second, giving respectively vapor residence times of approximately 7.5 and 6 seconds.

To obtain the stated desired degree of conversion in the catalyst lift conduit, it will be seen, that comparatively high catalyst to oil ratios are utilized. Thus, to obtain the desired conversion of a typical oil of average crackability to the extent of 30% by weight of the oil, catalyst/oil ratios of 10 or more by weight must be employed even with a lift of 100 foot height, otherwise such low catalyst velocities are had that smooth and uniform elevation of the catalyst cannot be achieved.

Excessively high catalyst velocities in the lift and particularly at the discharge outlet thereof can be avoided, for instance by tapering the lift conduit as described in our copending application, hereinbefore identified.

Generally stated, to effect substantial cracking of the hydrocarbon charge in the lift, average reaction temperatures of about 800–1000° F. should be employed, the charge being admitted to the lift reactor in vapor phase or in mixed phase carrying liquid suspended in the vapors. To obtain in the order of about 60% conversion of the charge, catalyst to oil weight ratios in excess of 10 must be employed for efficient operation, while for less conversion, lower catalyst to oil ratios down to about 7 can be used; or somewhat lower, as to about 5, in lift reactors of about 300 foot height. The space rates (weight of oil feed per hour per weight of catalyst in the reactor) under the described operating conditions will usually be in excess of about 10. In the more usual operation, the effluent discharged from the vapor disengaging vessel above the lift reactor will be separated into a gasoline fraction and a light fuel oil fraction. The remaining catalytic gas oil freed from very heavy bottoms, may be separately cracked or recycled in desired amount for addition to the fresh feed charged to the lift reactor. Thus, the recycle fraction may be sent directly to the pre-heater, H (Figure 1), together with the fresh feed which may also include a limited quantity of steam; or in some instances the recycle oil may by-pass the pre-heater and be added at its fractionation temperature directly to the overhead from the tar separator S.

It has previously been stated above that for efficient lifting and transporting of the catalyst at desired low attrition rates, the average linear velocity in the lift conduit or the maximum discharge velocity of the catalyst from that conduit must be kept within certain designated limits. Since the velocity of the transporting vapors largely determines the linear velocity of the catalyst, the transporting vapor velocity must be accordingly controlled to conform to the stated limits, while also taking into account the required minimum residence time of the vapors in the conduit to effect the desired degree of conversion. Although the slip velocity between the transporting gas stream and the catalyst will vary somewhat with the properties of the gas and with the nature of the catalyst particularly as to its size and pellet density, it can be stated generally that for catalyst of the indicated size range employed in practice of the invention and employing a crackable stock as transporting vapors, the average linear velocity of the vapors should lie in the preferred range of approximately 30 to 65 feet per second average linear velocity. Under these conditions the desired transporting efficiency under conditions effecting substantial conversion of the charge, will generally be obtained.

The following example is illustrative of a typical operation in cracking, employing a lift reactor of 200 foot height and using commercial synthetic silica-alumina bead catalyst of approximately 3 millimeter diameter, having a pellet density of 80 pounds per cubic foot. The charge employed is an East Texas gas oil boiling in the approximate range of 540–930° F. (28.9 A. P. I. gravity) and the conditions are given for conversion of 50% by weight of the charge in a single pass operation.

Feed rates:
Oil, mass velocity, lbs./sec. per square foot lift cross-section. 8.02
Catalyst, mass velocity, lbs./sec. per square foot lift cross-section. 155
Catalyst/oil ratio (wt./wt.) 19.3
Space rate (wt.oil/hr./wt. cat.) 27.9
Oil inlet temp. 820° F.
Catalyst inlet temp. 990° F.
Average reaction temp. 950° F.
Steam (weight percent, added to charge). 10%
Pressures:
Inlet 15 p. s. i. g.
Discharge 6 p. s. i. g.
Catalyst velocity (avg.) 30 ft./sec.
Oil vapor velocity (avg.) 51.3 ft./sec.
Oil residence time 3.9 sec.
Catalyst concentration in lift (avg.) 5.2 lbs./cu. ft.

Under the stated conditions about 37% (by volume of charge) of stabilized motor gasoline is produced.

Although in the particular example reference is had to synthetic silica-alumina as the cracking catalyst, it will be understood that other known or desired catalyst of natural or synthetic origin and of acceptable cracking activity may be used, including coarse granules, agglomerated pellets, or beads. Thus, catalyst prepared by activation of clay, such as acid-activated sub-bentonite clays, as well as synthetic silica-metal oxide catalysts, particularly those including alumina, magnesia, or zirconia, or mixtures of these, may be employed in the described process.

Obviously many modifications and variations of the invention as hereinbefore set forth may be made without departing from the spirit and scope thereof and therefore only such limitations should be imposed as are indicated in the appended claims.

We claim as our invention:

1. The process of cracking hydrocarbons with solid cracking catalyst, which comprises continuously introducing a crackable hydrocarbon charge into a transfer zone containing a laterally confined compact bed of hot granular catalyst of comparatively large particle size, said charge being introduced to flow upwardly through said bed of catalyst at sufficient velocity and in such quantity to cause lifting of catalyst in said bed, continuously transporting catalyst so lifted together with and under the impelling influence of said hydrocarbons vertically upward at controlled velocity through a long laterally confined path of substantially smaller lateral cross section than that of said transfer zone, effecting catalytic cracking of a portion of said hydrocarbons while in contact with catalyst during such upward transportation, discharging the catalyst and transporting vapors at the top of said path into an expanded vapor-disengaging zone thereby causing said catalyst as a result of consequent decrease in velocity to settle out from the impelling influence of transporting vapors, the catalyst thus settling out being contaminated with carbonaceous deposit as a result of the cracking of hydrocarbons effected during said upward transportation, supporting the catalyst thus settled out to form a compact bed of contaminated catalyst below the said disengaging zone, withdrawing contaminated catalyst from the bottom of the last named bed thereby causing descent of catalyst to a point of discharge from said compact bed, passing inert gas upwardly through the said bed of contaminated catalyst into said disengaging zone to purge said catalyst of occluded and adhering vaporizable products therein, discharging purge vapors together with vaporous products disengaged from catalyst in said vapor disengaging zone above said bed, passing the thus purged catalyst directly to a regeneration zone, effecting downward movement of catalyst in said regeneration zone as a compact mass, passing regenerating gas through said moving compact mass of catalyst in said regeneration zone to effect combustion of carbonaceous deposit in said catalyst and thereby heating said catalyst to desired temperature for reuse in contacting hydrocarbons, discharging the thus regenerated catalyst from said regeneration zone and continuously feeding the discharged catalyst from said regeneration zone to said transfer zone as a continuous uninterrupted confined column, the catalyst being fed to said transfer zone at a rate controlled by the rate of removal of catalyst from the bed of catalyst formed in said transfer zone, which removal of catalyst continuously takes place under the impelling influence of hydrocarbons introduced into said transfer zone, the velocity and rate of introduction of said hydrocarbons into said transfer zone being selected to cause transportation of the catalyst through said confined path above said transfer zone at desired weight ratios of catalyst to hydrocarbons, and the linear velocity of said hydrocarbons through said upward path being controlled with relation to the total length of said path so that said hydrocarbons traverse said path in not less than one and one-half seconds, the said weight ratios, linear velocity, and length of path being so correlated that substantial cracking of the hydrocarbons is effected during engagement of said hydrocarbons in the recited upward transportation of catalyst.

2. The process in accordance with claim 1 wherein the total length of the path traversed by said hydrocarbons in contact with the catalyst is between about 100 and 300 feet.

3. The process of claim 1 wherein the average linear velocity of said hydrocarbons flowing upwardly through said path is between about 30 to 65 feet per second.

4. The process of claim 1 wherein the pressure and quantity of the hydrocarbons introduced into said transfer zone is controlled within a predetermined range such that the maximum velocity achieved by the catalyst impelled thereby does not exceed 60 feet per second.

5. The process in accordance with claim 1 wherein a selected portion of the vapors discharged from said vapor disengaging zone and containing hydrocarbons is recycled for admixture with fresh hydrocarbon charge introduced into said transfer zone.

6. The process in accordance with claim 5 wherein the said selected portion of recycled material includes hydrocarbons having boiling points above the range of gasoline.

7. The process of cracking a hydrocarbon charge containing components boiling above the range of gasoline, which comprises continuously introducing said charge into a transfer zone containing a laterally confined compact bed of hot granular catalyst of an average size such that gases can be passed upwardly through a compact bed of such catalyst at pressure drops above 4 to 6 inches of water per linear foot bed of height without lifting particles from said bed, said catalyst being at a temperature not less than the desired reaction temperature to be employed in catalytic cracking of said charge, said charge being introduced under sufficient pressure and velocity to flow upwardly through said bed of catalyst to cause lifting of the catalyst from within said bed, continuously transporting catalyst so lifted together with and under the impelling influence of said charge vertically upward at controlled velocity through a long laterally confined path of substantially smaller lateral cross-section than that of said transfer zone, effecting catalytic cracking of a portion of said hydrocarbons while in contact with catalyst during such upward transportation, discharging the catalyst and transporting vapors at the top of said path into an expanded vapor-disengaging zone thereby causing said catalyst as a result of consequent decrease in velocity to settle out from the impelling influence of transporting vapors, the catalyst thus settling out being contaminated with carbonaceous deposit as a result of the cracking of hydrocarbons effected during said upward transportation, supporting the catalyst thus settled out to form a compact bed of contaminated catalyst below the said disengaging zone, withdrawing contaminated catalyst from the bottom of the last named bed as a plurality of spaced narrow laterally confined columns thereby effecting a general downward movement of catalyst in said compact bed, passing inert gas through said narrow confined columns of catalyst and upwardly through the said bed of contaminant catalyst thereabove into said disengaging zone to purge said catalyst of occluded and adhering vaporizable products therein, and thereby preventing flow of hydrocarbon vapors downwardly from said disengaging zone, discharging purge vapors together with vaporous products disengaged from catalyst in said vapor disengaging zone above said bed, passing the thus purged catalyst directly to a regeneration zone, effecting downward movement of catalyst in said regeneration zone as a compact mass in countercurrent contact with regenerating gas passed upwardly through the catalyst in said regeneration zone to effect combustion of carbonaceous deposit in said catalyst and thereby to heat said catalyst to above the desired hydrocarbon conversion temperature, discharging the thus regenerated catalyst from said regeneration zone and continuously feeding the discharged catalyst from said regeneration zone to said transfer zone as a continuous uninterrupted confined column, the catalyst being fed to said transfer zone at a rate controlled by the rate of removal of catalyst from the bed of catalyst formed in said transfer zone, which removal of catalyst continuously takes place under the impelling influence of hydrocarbons introduced into said transfer zone, the velocity and rate of introduction of said hydrocarbons into said transfer zone being selected to cause transportation of the catalyst through said confined path above said transfer zone at desired weight ratios of catalyst to hydrocarbons in excess of 5, and the linear velocity of said hydrocarbons through said upward path being so controlled with relation to the total length of said path that said hydrocarbons traverse said path in not less than 1½ seconds, and the linear velocity of the catalyst during transportation through said vertical path does not exceed a maximum of 60 feet per second.

CHALMER G. KIRKBRIDE.
JACK C. DART.

REFERENCES CITED

The following references are of record in the file of this patent:

UNITED STATES PATENTS

| Number | Name | Date |
|---|---|---|
| 2,396,109 | Martin | Mar. 5, 1946 |
| 2,414,373 | Gerhold | Jan. 14, 1947 |
| 2,427,341 | Alther | Sept. 16, 1947 |
| 2,459,824 | Leffer | Jan. 25, 1949 |